(12) United States Patent
Ohno

(10) Patent No.: US 9,827,942 B2
(45) Date of Patent: Nov. 28, 2017

(54) OCCUPANT PROTECTION DEVICE

(71) Applicant: TOYOTA JIDOSHA KABUSHIKI KAISHA, Toyota-shi, Aichi-ken (JP)

(72) Inventor: Mitsuyoshi Ohno, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/175,552

(22) Filed: Jun. 7, 2016

(65) Prior Publication Data
US 2017/0036641 A1    Feb. 9, 2017

(30) Foreign Application Priority Data

Aug. 3, 2015  (JP) .................................. 2015-153278

(51) Int. Cl.
| B60R 21/263 | (2011.01) |
| B60R 21/013 | (2006.01) |
| B60R 21/207 | (2006.01) |
| B60R 21/231 | (2011.01) |

(52) U.S. Cl.
CPC .......... B60R 21/263 (2013.01); B60R 21/013 (2013.01); B60R 21/207 (2013.01); *B60R 2021/23107* (2013.01); *B60R 2021/23146* (2013.01)

(58) Field of Classification Search
CPC ... B60R 21/263; B60R 21/013; B60R 21/207; B60R 2021/23146; B60R 2021/23107
See application file for complete search history.

(56) References Cited

U.S. PATENT DOCUMENTS

| 5,499,840 | A | * | 3/1996 | Nakano | B60N 2/0705 280/730.1 |
| 6,129,419 | A | * | 10/2000 | Neale | B60N 2/4415 297/284.4 |
| 7,708,343 | B2 | * | 5/2010 | Kayumi | B60N 2/4415 297/284.9 |
| 8,459,690 | B2 | * | 6/2013 | Breuninger | B60R 21/207 280/730.2 |
| 8,474,862 | B2 | * | 7/2013 | Pursche | B60R 21/0134 280/729 |
| 8,702,120 | B2 | * | 4/2014 | Kalisz | B60R 21/207 180/271 |
| 8,702,123 | B2 | * | 4/2014 | Mazanek | B60R 21/207 280/729 |
| 9,045,063 | B2 | * | 6/2015 | Line | B60N 2/449 |

(Continued)

FOREIGN PATENT DOCUMENTS

| JP | 2010-064632 A | 3/2010 |
| JP | 2014-148235 A | 8/2014 |

*Primary Examiner* — Drew J Brown
(74) *Attorney, Agent, or Firm* — Oliff PLC

(57) ABSTRACT

An occupant protection device comprises a pair of bag bodies, that is provided in left and right side support sections in a seat width direction of a seatback of a vehicle, and that displace the side support sections by inflating when supplied with gas; a first gas supply mechanism that supplies gas to the pair of bag bodies during everyday use; and a second gas supply mechanism that supplies gas to at least one out of the pair of bag bodies and that inflates the bag body earlier than in cases in which the pair of bag bodies are inflated by gas supplied by the first gas supply mechanism, in the event that a collision has been predicted or detected.

8 Claims, 10 Drawing Sheets

(56) References Cited

U.S. PATENT DOCUMENTS

| | | | |
|---|---|---|---|
| 9,393,891 B2* | 7/2016 | Beier | |
| 2007/0057551 A1* | 3/2007 | Lachenmann | B60N 2/4492 297/284.9 |
| 2014/0042733 A1* | 2/2014 | Fukawatase | B60R 21/23138 280/730.2 |
| 2016/0159307 A1* | 6/2016 | Fujiwara | B60R 21/207 280/729 |
| 2017/0036634 A1* | 2/2017 | Ohno | B60R 21/207 |

\* cited by examiner

OCCUPANT PROTECTION DEVICE

CROSS-REFERENCE TO RELATED APPLICATION

This application claims priority under 35 USC 119 from Japanese Patent Application No. 2015-153278 filed Aug. 3, 2015, the disclosure of which is incorporated by reference herein in its entirely.

BACKGROUND

Technical Field

Preferred embodiments relate to an occupant protection device.

Related Art

JPA No. 2010-64632 describes technology in which a vehicle occupant restraint device suppresses relative displacement of a seated occupant in the seat width direction in a collision in which acceleration acts in at least the vehicle width direction, such as in what is referred to as an offset collision, a side-on collision (side collision), or the like.

Specifically, displacement of a seated occupant in the seat width direction is suppressed by airbags disposed in side support sections inflating, thereby extending the side support sections toward the vehicle front side.

SUMMARY

However, in such technology, since the side support sections are made to extend toward the vehicle front side by inflating the airbags, there is room for further improvement from the perspective of operating the side support sections earlier.

In consideration of the above circumstances, an object of preferred embodiments is to provide an occupant protection device capable of operating side support sections earlier to suppress relative displacement of a seated occupant in the seat width direction at an early stage, thereby protecting the seated occupant when a collision such as a side collision has been predicted or detected.

An occupant protection device of a first aspect of the disclosure includes a pair of bag bodies, that is provided in left and right side support sections in a seat width direction of a seatback of a vehicle, and that displace the side support sections by inflating when supplied with gas, a first gas supply mechanism that supplies gas to the pair of bag bodies during everyday use, and a second gas supply mechanism that supplies gas to at least one out of the pair of bag bodies and that inflates the bag bodies earlier than in cases in which the pair of bag bodies are inflated by gas supplied by the first gas supply mechanism, in the event that a collision has been predicted or detected.

In the occupant protection device of the first aspect, the pair of bag bodies is provided in the left and right side support sections in the seat width direction of the seatback, and the side support sections are displaced due to gas being supplied to the bag bodies and inflating the bag bodies. The side support sections provided at the seat width direction left and right of the seatback are displaced in this manner to enable holding of the seated occupant in the seat width direction to be adjusted.

In the first aspect, the first gas supply mechanism and the second gas supply mechanism are provided. During everyday use, gas is supplied to the pair of bag bodies by the first gas supply mechanism. The pair of bag bodies thereby inflates, enabling displacement of the side support sections. The seated occupant, who is relatively displaced in the seat width direction with respect to the seatback, is thereby held.

When a collision has been predicted or detected, at least one out of the pair of bag bodies is inflated by the second gas supply mechanism earlier than in cases in which the pair of bag bodies are inflated by gas supplied by the first gas supply mechanism. Namely, the side support section can be displaced earlier, and relative displacement of the seated occupant toward one seat width direction side (collision side) can be suppressed at an early stage and protects the seated occupant.

Note that here, "during everyday use" refers to normal times of usage, when a collision has not been predicted or detected. Moreover. "collision", for example, includes head-on collisions such as what are called offset collisions and oblique collisions, side-on collisions (side collisions), and rollovers.

An occupant protection device of a second aspect of the disclosure is the occupant protection device of the first aspect, wherein the second gas supply mechanism includes a reserve tank that is connected to at least one out of the pair of bag bodies, that contains high pressure gas at a higher pressure than the pressure in the bag bodies, and that is capable of supplying the high pressure gas to the bag body.

In the occupant protection device of the second aspect, the reserve tank is connected to at least one out of the pair of the bag bodies. The reserve tank contains high pressure gas at a higher pressure than the pressure in the bag bodies, and is capable of supplying the high pressure gas to the bag body. Note that here, "high pressure gas" does not have the meaning as stipulated by the High Pressure Gas Safety Act, but rather denotes gas at higher pressure than the pressure in the bag bodies.

An occupant protection device of a third aspect of the disclosure is the occupant protection device of the second aspect, wherein the pair of bag bodies includes an outer side bag body provided in an outer side support section that is disposed on a window side of a vehicle, and to which the reserve tank is connected, and an inner side bag body provided in an inner side support section that is disposed on the opposite side to the outer side support section.

In the occupant protection device of the third aspect, during everyday use, gas can be supplied to the outer side bag body and the inner side bag body. However, when a collision has been predicted or detected, high pressure gas within the reserve tank is supplied to the outer side bag body.

An occupant protection device of a fourth aspect of the disclosure is the occupant protection device of the third aspect, wherein the reserve tank is disposed in the outer side support section.

In the occupant protection device of the fourth aspect, since the reserve tank is disposed in the outer side support section, the reserve tank can be disposed closer to the outer side bag body than when the reserve tank is provided in the inner side support section disposed on the opposite side to the outer side support section. The length of a connection member (an outer side bag body second connection member, described later), that joins the reserve tank to the outer side bag body and through which high pressure gas flows, can thereby be shortened. Accordingly, pressure loss of the high pressure gas flowing in the connection member can be reduced An occupant protection device of a fifth aspect of the disclosure is the occupant protection device of the third aspect or the fourth aspect, wherein the first gas supply mechanism includes a pump provided in the inner side support section, an outer side bag body first connection member that is connected to the pump and the outer side bag body, and that supplies gas from the pump to the outer side bag body, and an inner side bag body first connection member that is connected to the pump and the inner side bag body, and that supplies gas from the pump to the inner side bag body.

In the occupant protection device of the fifth aspect, the first gas supply mechanism includes the pump, the outer side bag body first connection member, and the inner side bag body first connection member, and the pump is provided in the inner side support section. The outer side bag body first connection member connects the pump to the outer side bag body, and gas is supplied from the pump to the outer side bag body through the outer side bag body first connection member. The inner side bag body first connection member connects the pump to the inner side bag body, and gas is supplied from the pump to the inner side bag body through the inner side bag body first connection member.

The window side of the vehicle seat, namely, the outer side support section, is sometimes provided with a far side airbag inside. In the present disclosure, a space is thereby secured for the pump by providing the pump in the inner side support section at a position on the opposite side to the window side of the vehicle seat.

An occupant protection device of a sixth aspect of the disclosure is the occupant protection device of the fifth aspect, further includes a communicating connection member that places the outer side bag body and the inner side bag body in communication with each other.

In the occupant protection device of the sixth aspect, since the communicating connection member that places the outer side bag body and the inner side bag body in communication with each other is provided, when gas is supplied to either the inner side bag body or the outer side bag body, the pressure in the outer side bag body and the pressure in the inner side bag body can be substantially equalized using the communicating connection member.

An occupant protection device of a seventh aspect of the disclosure is the occupant protection device of the fifth aspect or the sixth aspect, wherein the second gas supply mechanism further includes a reserve tank connection member that is connected to the pump and the reserve tank, and that supplies gas from the pump to the reserve tank.

In the occupant protection device of the seventh aspect, the second gas supply mechanism further includes the reserve tank connection member, the reserve tank connection member is connected to the pump and the reserve tank, and can supply gas from the pump to the reserve tank. Although high pressure gas is contained within the reserve tank, there is difficulty in continuously retaining the pressure of the high pressure gas within the reserve tank, since the pressure gradually lowers with the passing of time.

Thus, gas from the pump is supplied to the reserve tank using the reserve tank connection member. The pressure of the gas (gas that has become a lower pressure than a preset pressure) within the reserve tank can thereby be raised, as a result enabling the pressure of the high pressure gas within the reserve tank to be retained at a substantially constant pressure.

An occupant protection device of an eighth aspect of the disclosure is the occupant protection device of any one of the third aspect to the seventh aspect, wherein the second gas supply mechanism further includes an outer side bag body second connection member that is connected to the reserve tank and the outer side bag body, and that supplies the high pressure gas within the reserve tank to the outer side bag body, and an inner side bag body second connection member that is connected to the reserve tank and the inner side bag body, and that supplies the high pressure gas within the reserve tank to the inner side bag body.

In the occupant protection device of the eighth aspect, the second gas supply mechanism further includes the outer side bag body second connection member and the inner side bag body second connection member. The outer side bag body second connection member connects the reserve tank to the outer side bag body, and high pressure gas within the reserve tank is supplied to the outer side bag body through the outer side bag body second connection member. The inner side bag body second connection member connects the reserve tank to the inner side bag body, and high pressure gas within the reserve tank is supplied to the inner side bag body through the inner side bag body second connection member.

An occupant protection device of a ninth aspect of the disclosure is the occupant protection device of the eighth aspect, wherein: a cross-sectional area of a flow path of the outer side bag body second connection member is set larger than a cross-sectional area of a flow path of the outer side bag body first connection member that is connected to the outer side bag body and that supplies gas from the pump to the outer side bag body.

In the occupant protection device of the ninth aspect, the cross-sectional area of a flow path of the outer side bag body second connection member is set larger than the cross-sectional area of a flow path of the outer side bag body first connection member. At the same speed of flow, the flow rate of high pressure gas flowing in the outer side bag body second connection member can thereby be higher than the flow rate of high pressure gas flowing in the outer side bag body first connection member.

An occupant protection device of a tenth aspect of the disclosure is the occupant protection device of the eighth aspect, further includes: a bag body open/close valve, that is respectively provided at both of the pair of bag bodies so as to be capable of opening and closing between the both of the pair of bag bodies and the reserve tank, and that supply the high pressure gas within the reserve tank to the respective bag body by opening; and a controller that opens the bag body open/close valve at the bag body disposed on a side nearest to a position of a collision predicted or detected by a crash safety sensor.

The occupant protection device of the tenth aspect includes the bag body open/close valve, that is respectively provided at the both of the pair of bag bodies so as to be capable of opening and closing between the pair of bag bodies and the reserve tank. High pressure gas within the reserve tank is supplied to the respective bag bodies by opening the bag body open/close valves.

Note that for example, in the present disclosure, the controller opens the bag body open/close valve at the bag body on the side nearest to a position of a collision predicted or detected by the crash safety sensor. The bag body disposed on the collision side can thereby be made to inflate early. Note that "collision" here encompass cases in which a collision with a colliding body has been predicted or detected on the side nearest the seated occupant in question (near-side collision), cases in which a collision with a colliding body has been predicted or detected on the side farther away from the seated occupant (far-side collision), vehicle rollovers, and the like.

An occupant protection device of an eleventh aspect of the disclosure is the occupant protection device of the eighth aspect, further including a bag body open/close valve that is respectively provided at both of the pair of bag bodies so as to be capable of opening and closing between the both of the pair of bag bodies and the reserve tank, and that supply the high pressure gas within the reserve tank to the respective bag body by opening, and a controller that opens the both of the bag body open/close valves of the pair of bag bodies when a vehicle rollover has been predicted or detected by a crash safety sensor that predicts or detects a collision.

In the occupant protection device of the eleventh aspect, the controller opens the both of the bag body open/close valves of the pair of bag bodies (outer side bag body, inner side bag body) when a vehicle rollover has been predicted or detected by the crash safety sensor. The outer side bag body and the inner side bag body can thereby be inflated at substantially the same time as each other.

As explained above, the occupant protection device of the first aspect has the excellent advantageous effect of operating the side support sections earlier, thereby enabling relative displacement of the seated occupant in the seat width direction to be suppressed at an early stage, protecting the seated occupant when a collision such as a side collision has been predicted or detected.

The occupant protection device of the second aspect has the excellent advantageous effect of enabling high pressure gas to be supplied to the bag bodies, thereby enabling the bag bodies to inflate at an early stage.

The occupant protection device of the third aspect has the excellent advantageous effect of enabling the outer side bag body to be inflated at an early stage.

The occupant protection device of the fourth aspect has the excellent advantageous effect of enabling the pressure loss of the high pressure gas flowing in the connection member connecting the reserve tank to the outer side bag body to be reduced.

The occupant protection device of the fifth aspect has the excellent advantageous effect of enabling a space for the pump to be secured.

The occupant protection device of the sixth aspect has the excellent advantageous effect of enabling the pressure in the outer side bag body and the pressure in the inner side bag body to be substantially equalized.

The occupant protection device of the seventh aspect has the excellent advantageous effect of enabling the pressure of the gas within the reserve tank to be retained substantially constant.

The occupant protection device of the eighth aspect has the excellent advantageous effect of enabling the inner side bag body to also be inflated at an early stage when a collision has been predicted or detected.

The occupant protection device of the ninth aspect has the excellent advantageous effect of enabling the outer side bag body to be inflated at an earlier stage when a collision has been predicted or detected by forming the cross-sectional area of the flow path of the outer side bag body second connection member larger.

The occupant protection device of the tenth aspect has the excellent advantageous effect of enabling the seated occupant to be effectively protected according to the collision mode.

The occupant protection device of the eleventh aspect has the excellent advantageous effect of enabling the outer side bag body and the inner side bag body to inflate at substantially the same time as each other when a vehicle rollover is predicted or detected, enabling the seated occupant to be protected so as not to be relatively displaced in the seat width direction with respect to the seatback.

BRIEF DESCRIPTION OF THE DRAWINGS

Preferred embodiments will be described in detail based on the following figures, wherein.

DETAILED DESCRIPTION

Explanation follows regarding an occupant protection device according to exemplary embodiments, with reference to the drawings. Note that in the respective drawings, the arrow FR, the arrow UP, and the arrow OUT respectively indicate the front direction, upward direction, and the vehicle width direction outside direction of a vehicle applied with the occupant protection device according to the exemplary embodiments of the present disclosure, as appropriate. In the exemplary embodiments, the front-rear, left-right, and up-down directions of a vehicle seat applied with the occupant protection device match the front-rear, left-right, and up-down directions of the vehicle.

First Exemplary Embodiment

Configuration of Occupant Protection Device

Figure 1:
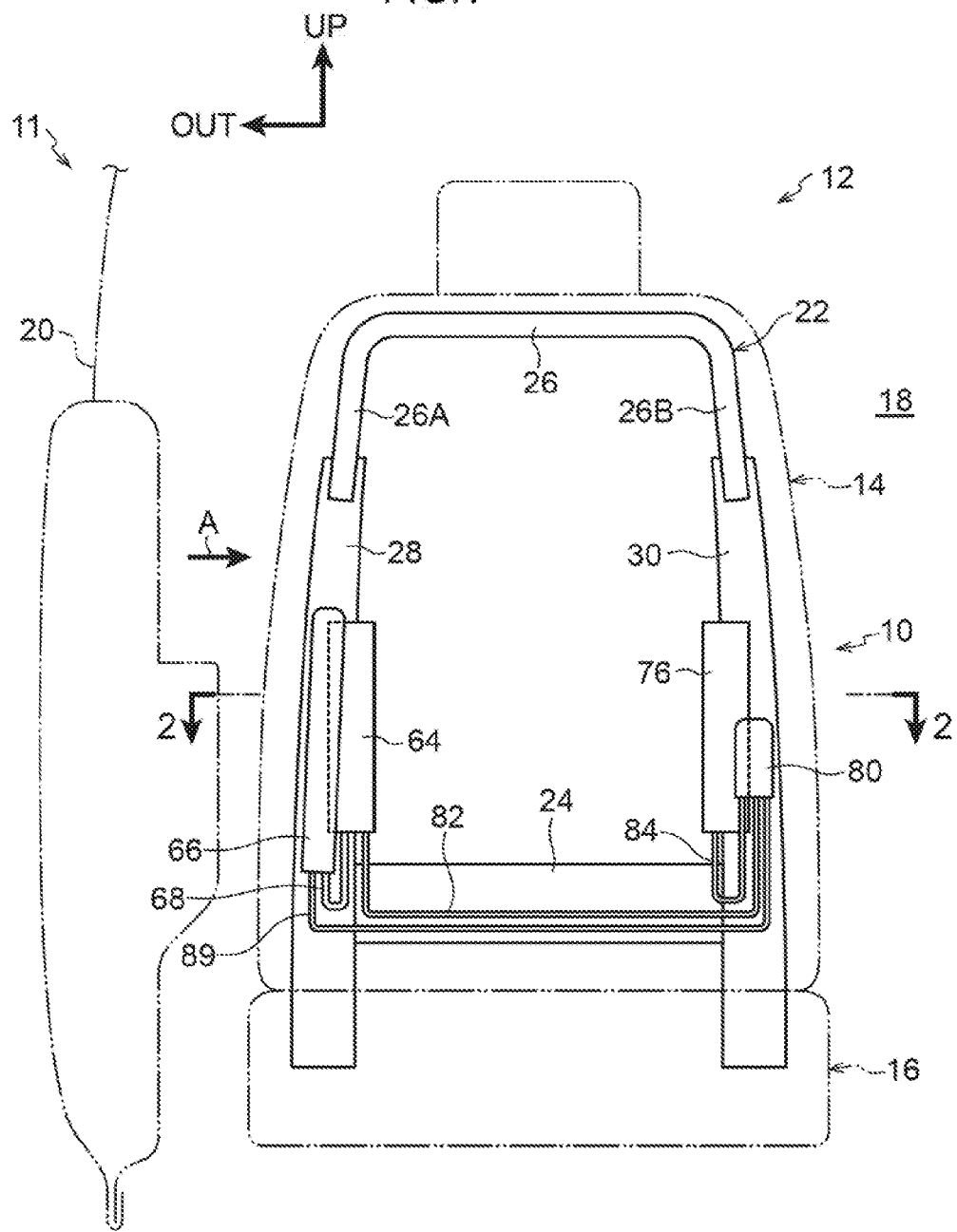
FIG. 1 is a schematic back view of an occupant protection device according to an exemplary embodiment.

First, explanation follows regarding configuration of an occupant protection device according to a first exemplary embodiment. FIG. 1 illustrates a back face view of a vehicle seat 12 applied with an occupant protection device 10 according to the present exemplary embodiment. A seatback 14 is provided at the vehicle seat 12, and the seatback 14 is coupled to a rear end portion of a seat cushion 16 so as to support the back of an occupant seated on the seat cushion 16 (referred to below as "seated occupant").

Herein, the left side of a vehicle cabin interior 18 configures a window section 20 side (outer side), and the vehicle seat 12 is disposed on the left side of the vehicle cabin interior 18; however, the vehicle seat 12 may be disposed on the right side of the vehicle cabin interior 18. However, in such cases, the vehicle seat 12 would be configured with left-right symmetry with respect to the present exemplary embodiment.

The seatback 14 includes a seat frame 22 made of metal. The seat frame 22 has a substantially rectangular shape, and includes a lower frame 24 disposed at a lower portion of the seat frame 22 and extending along the width direction of the seatback 14, and an upper frame 26 disposed at an upper portion of the seat frame 22 and extending along the width direction of the seatback 14. Bent portions 26A, 26B are formed bending toward the lower side at both length direction end portions of the upper frame 26. A left frame 28 joins the bent portion 26A of the upper frame section 26 to the lower frame 24, and is disposed on the left side of the vehicle seat 12 running along the up-down direction of the seatback 14. Moreover, a right frame 30 joins the bent portion 26B to the lower frame 24, and is disposed on the right side of the vehicle seat 12 running along the up-down direction of the seatback 14.

Note that in the present exemplary embodiment, the seatback 14 is provided with the seat frame 22 configured by the lower frame 24, the upper frame 26, the left frame 28, and the right frame 30; however, there is no limitation thereto. For example, although not illustrated in the drawings, the seatback 14 may be provided with what is referred to as a shell frame having a shell shape open to the seat front side.

As described above, the vehicle seat 12 here is disposed on the left side of the vehicle cabin interior 18, such that the left side of the vehicle cabin interior 18 is the window 20 side from the perspective of the vehicle seat 12. For convenience of explanation hereafter, the left frame 28 is accordingly referred to as the outer side frame 28, and the right frame 30 is referred to as the inner side frame 30. Moreover, members disposed to the left and right of the vehicle seat 12 described below are also respectively referred to as being on the outer side and on the inside, similarly to the frame.

Figure 2:
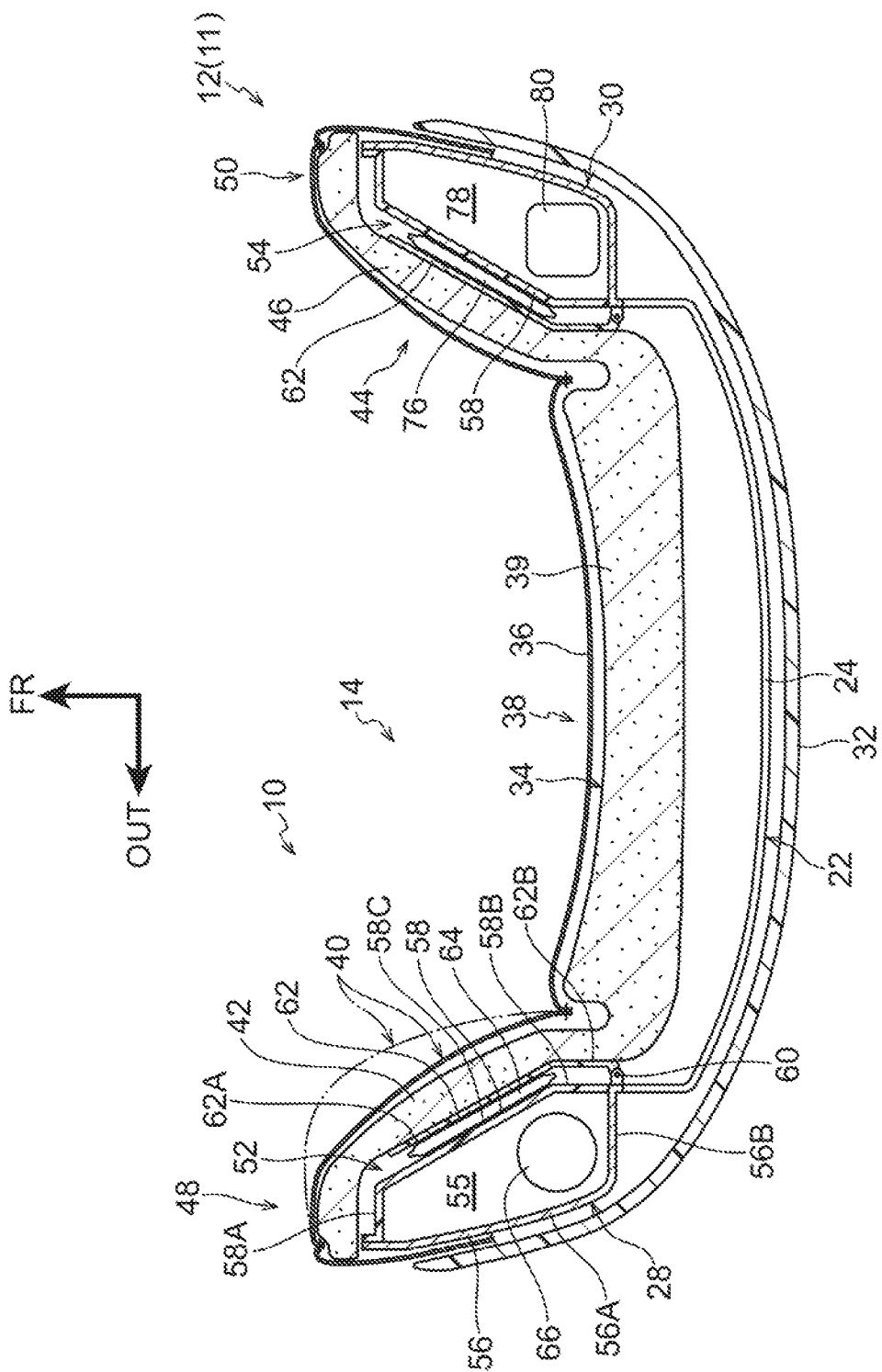
FIG. 2 is a cross-sectional view along line 2-2 in FIG. 1.
Figure 3:
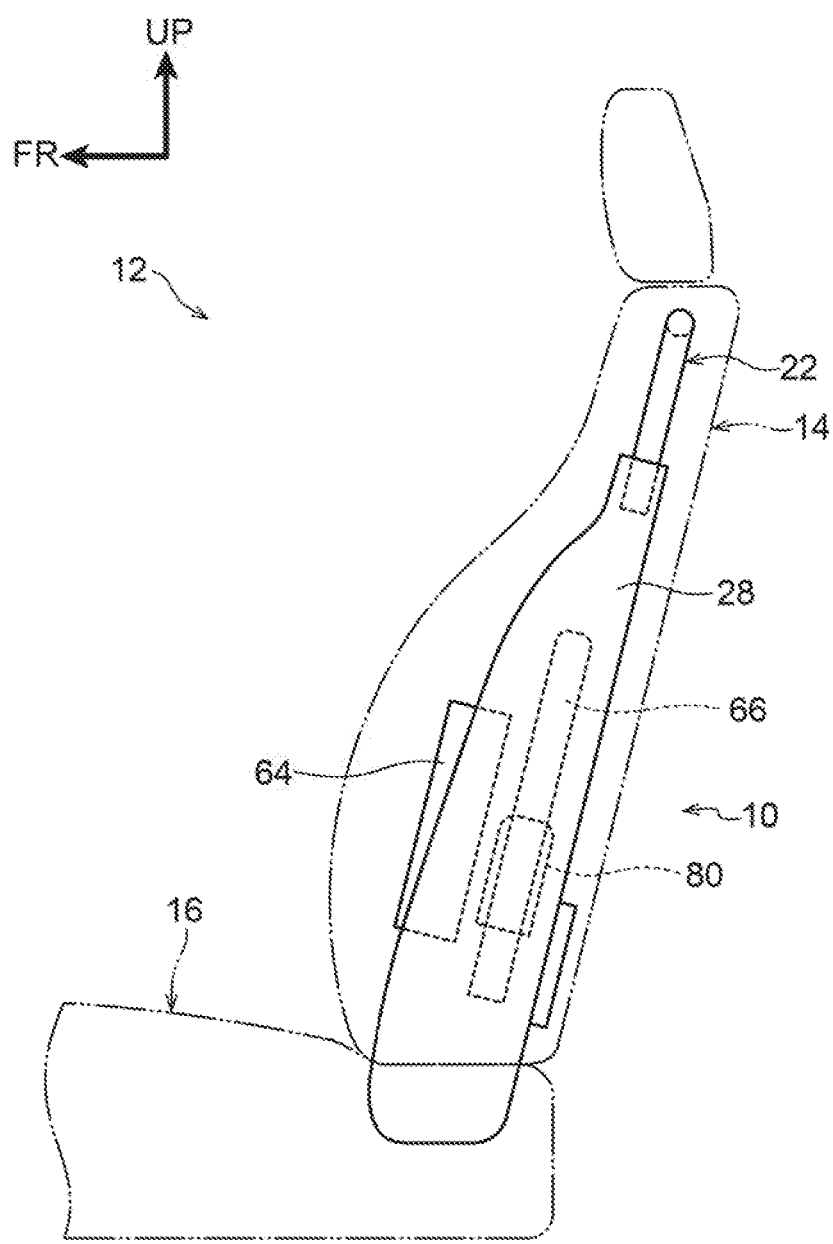
FIG. 3 is a side view of FIG. 1 viewed along the arrow A direction.

As illustrated in FIG. 2, the seat frame 22 is covered from the seat rear side and both outer sides in the seat width direction by a back board 32 made of resin. A seatback pad 34, this being a cushion member made of urethane, is attached to the seat front side of the seat frame 22. The seatback pad 34 is covered from the seat front side by a seatback cover 36, this being a cover member.

The above-described seatback 14 includes a seatback main body 38 that supports a back of a seated occupant from the seat rear side, and is provided with an outer side support section 40 on the seat width direction left side of the seatback main body 38. Moreover, an inner side support section 44 is provided on the seat width direction right side of the seatback main body 38. The outer side support section 40 and the inner side support section 44 are configured protruding out further to the seat front side than the seatback main body 38 so as to support the upper body of the seated occupant from the sides.

The seatback pad 34 also includes a seatback pad main body 39 provided at the seatback main body 38, and an outer side pad 42 is provided in the outer side support section 40. An inner side pad 46 is also provided in the inner side support section 44. The outer side pad 42 and the inner side pad 46 extend from seat width direction outside end portions of the seatback pad main body 39 obliquely toward the seat front side and the seat width direction outsides.

In the present exemplary embodiment, an outer side support section adjustment mechanism 48, serving as a second gas supply mechanism, is disposed between the outer side frame 28 and the outer side pad 42. Moreover, an inner side support section adjustment mechanism 50, serving as a first gas supply mechanism, is disposed between the inner side frame 30 and the inner side pad 46.

The outer side support section adjustment mechanism 48 includes a mechanism unit 52, and part of the mechanism unit 52 is formed by the outer side frame 28. The inner side support section adjustment mechanism 50 also includes a mechanism unit 54, similarly to the outer side support section adjustment mechanism 48, and part of the mechanism unit 54 is formed by the inner side frame 30.

Note that the mechanism unit 52 and the mechanism unit 54 have substantially the same configuration as each other, and so representative explanation here is mainly regarding the mechanism unit 52 of the outer side support section adjustment mechanism 48. Moreover, parts of the mechanism unit 54 of the inner side support section adjustment mechanism 50 for which explanation is omitted are appended with the same reference numerals as in the mechanism unit 52.

As illustrated in FIG. 2, the outer side frame 28 that configures part of the mechanism unit 52 has a substantially rectangular shape in plan cross-section view. The outer side frame 28 is formed with an outer side wall 56 provided on the seat width direction outer side of the outer side frame 28, and an inner side wall 58 provided on the seat width direction inner side of the outer side frame 28. A space 55, formed so as to gradually narrow on progression toward the front side, is provided inside the outside frame 28.

The outer side wall 56 has a substantially L-shape in plan cross-section view, and is formed by a longitudinal wall 56A disposed running along the vehicle front-rear direction and a lateral wall 56B disposed running along the vehicle width direction. Moreover, the inner side wall 58 is configured including a lateral wall 58A disposed running along the vehicle width direction at a front portion of the inner side wall 58 and a longitudinal wall 58B disposed running along the vehicle front-rear direction at a rear portion of the inner side wall 58. The lateral wall 58A is formed shorter than the lateral wall 56B of the outer side wall 56, and the longitudinal wall 58B is formed shorter than the longitudinal wall 56A of the outer side wall 56. The inner side wall 58 also includes a support wall 58C that joins the longitudinal wall 58B and the lateral wall 58A together, and the support wall 58C is inclined from a front end portion of the longitudinal wall 58B toward the vehicle width direction outside on progression toward the front side.

A hinge 60 is provided at a seat width direction central side of the outer side frame 28. A movable plate 62 is attached to the hinge 60 at the seat width direction central side of the outer side frame 28, and is capable of swinging along the vehicle width direction. The movable plate 62 constructs another part of the mechanism unit 52, and is formed with substantially the same shape as the support wall 58C and the longitudinal wall 58B of the inner side wall 58. The movable plate 62 is separated from the inner side wall 58 and is formed including a movable plate upper portion 62A and a movable plate lower portion 62B, disposed substantially parallel to the support wall 58C and the longitudinal wall 58B, respectively.

Furthermore, the movable plate 62 abuts the outer side pad 42 and is provided with an outer side bladder 64, serving as an outer side bag body, between the inner side wall 58 and the movable plate 62 of the outer side frame 28. The movable plate 62 is pressed in a direction away from the inner side wall 58 by inflation of the outer side bladder 64, such that the movable plate 62 swings about the hinge portion 60 toward the seat width direction central side.

Figure 6:
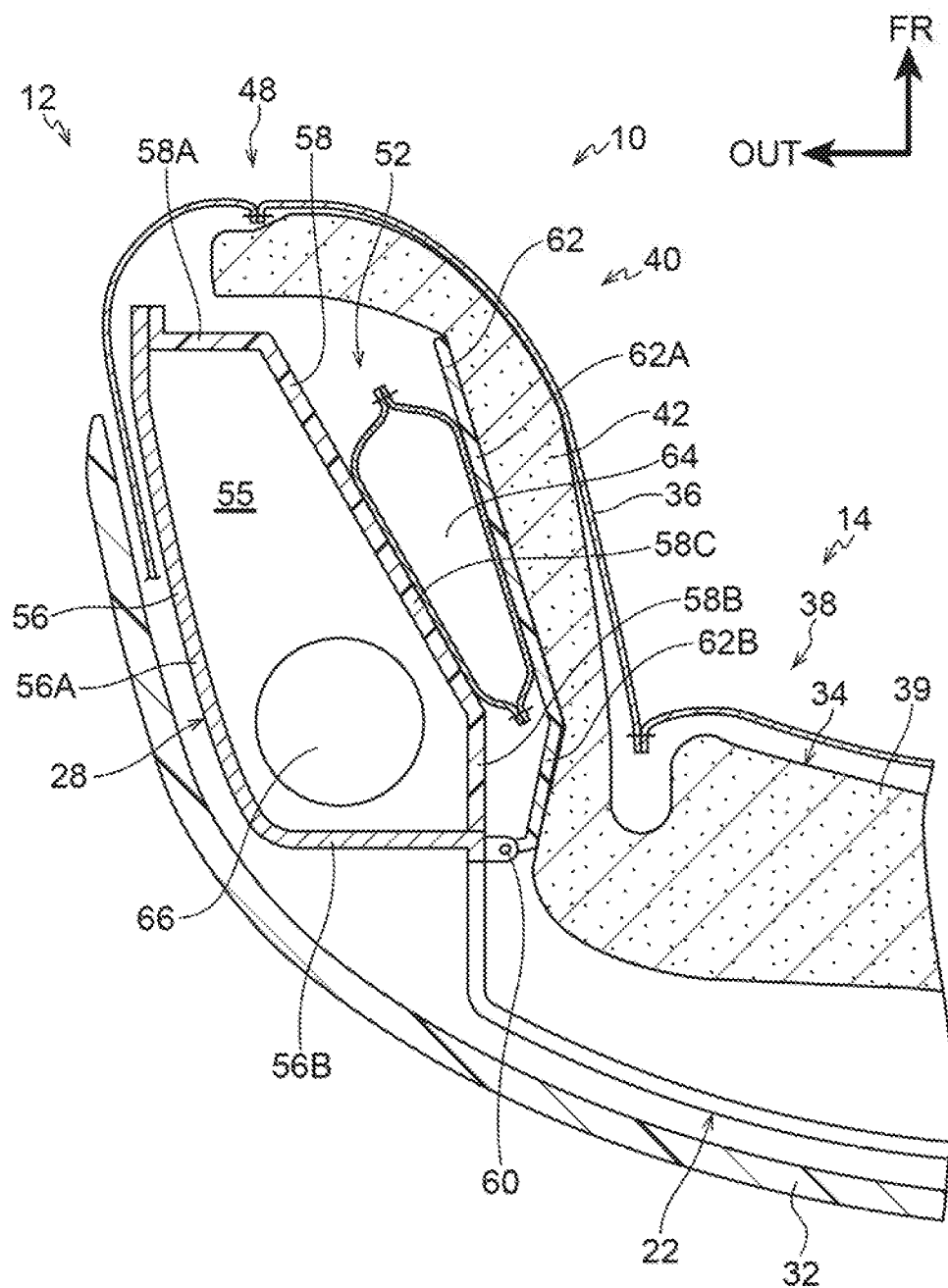
FIG. 6 is an enlarged cross-section of relevant portions in which the left side portion of FIG. 2 is enlarged, illustrating an inflated state of an outer side bladder that configures part of an occupant protection device according to the first exemplary embodiment.

As described above, the movable plate 62 abuts the outer side pad 42. As illustrated in FIG. 6, the outer side pad 42 is thereby pressed by the movable plate 62 and displaces toward a central side of the vehicle seat 12 due to the movable plate 62 swinging toward the seat width direction central side.

A reserve tank 66 is disposed in the space 55 of the outer side frame 28, and high pressure gas, at higher pressure than the pressure in the outer side bladder 64, is contained within the reserve tank 66. Note that "high pressure gas" here does not have the meaning as stipulated by the High Pressure Gas Safety Act, but rather denotes gas at higher pressure than the pressure in the outer side bag body of the everyday use.

Figure 4:
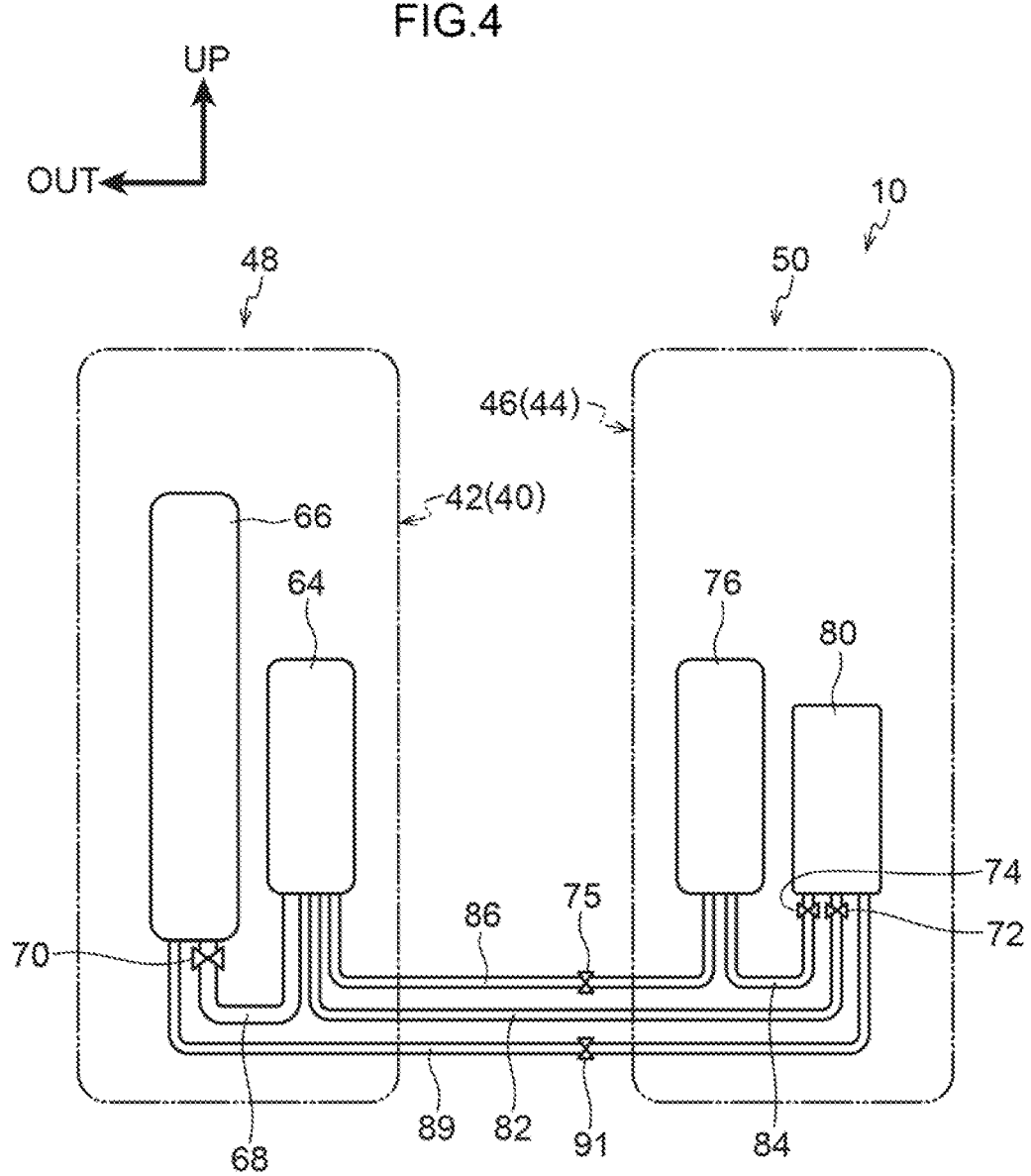
FIG. 4 is a schematic configuration diagram illustrating configuration of an occupant protection device according to a first exemplary embodiment.
Figure 5:
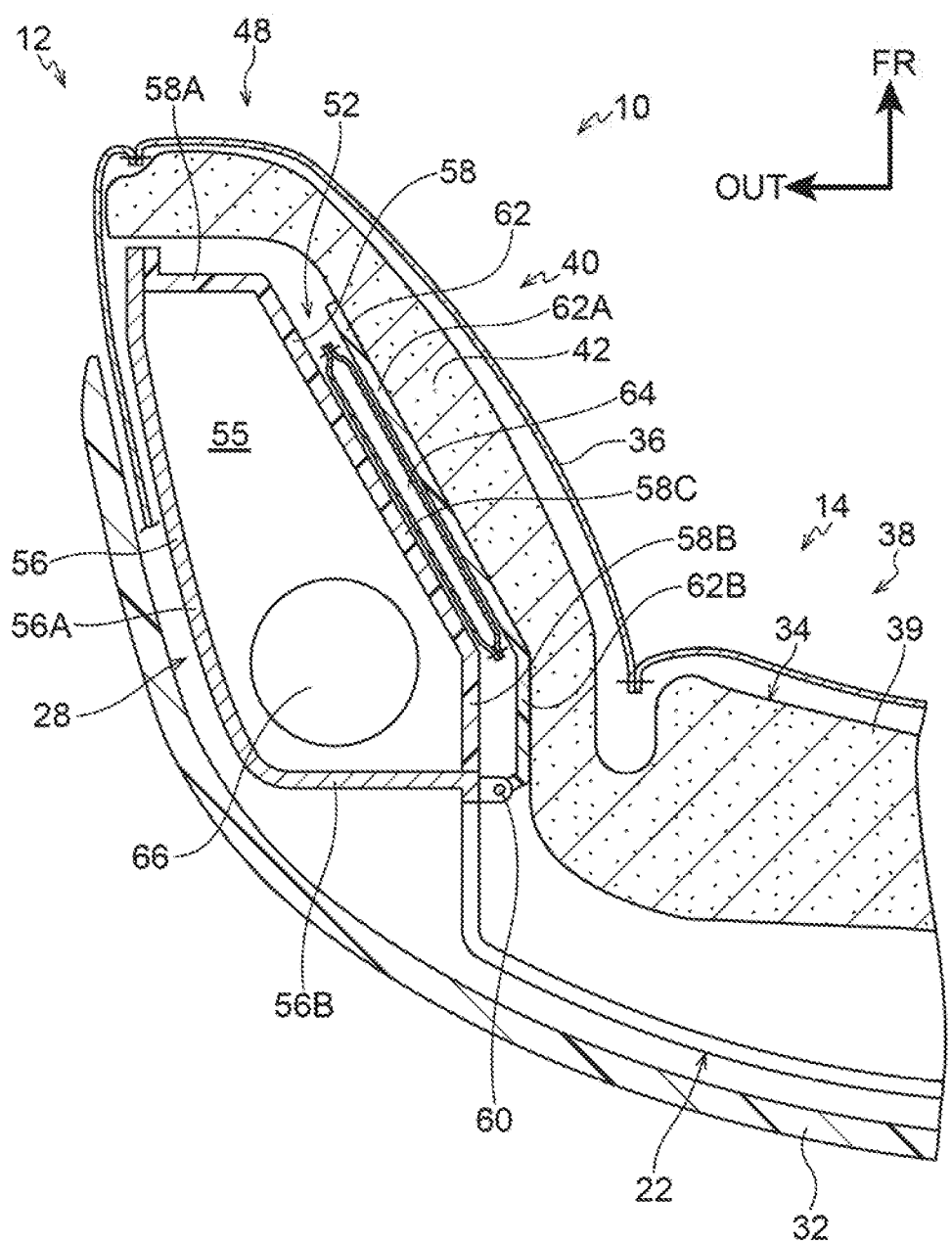
FIG. 5 is an enlarged cross-section of relevant portions in which a left side portion of FIG. 2 is enlarged, illustrating a non-inflated state of an outer side bladder that configures part of an occupant protection device according to the first exemplary embodiment.

As illustrated in FIG. 4, the reserve tank 66 is connected to the outer side bladder 64 through an outer side bladder supply tube (outer side bag body second connection member) 68. Namely, one end of the outer side bladder supply tube 68 is connected to the reserve tank 66, and the other end of the outer side bladder supply tube 68 is connected to the outer side bladder 64. Moreover, the outer side bladder supply tube 68 is provided with an open/close valve (a bag body open/close valve) 70, and high pressure gas within the reserve tank 66 is capable of being supplied to the outer side bladder 64 through the outer side bladder supply tube 68 in an open state of the open/close valve 70.

Note that the open/close valve 70 here is provided at the outer side bladder supply tube 68; however, there is no limitation to this configuration as long as the open/close valve 70 is provided between the reserve tank 66 and the outer side bladder 64. For example, the open/close valve 70 may be provided at either the reserve tank 66 or to the outer side bladder 64. Similarly to the open/close valve 70, open/close valves 72, 74, 75, 87, described later, do not necessarily have to be provided at the respective tubes.

As illustrated in FIG. 2, an inner side bladder 76, serving as an inner side bag body, is provided between the inner side wall 58 and the movable plate 62 of the inner side frame 30 included in the inner side support section 44, corresponding to the outer side support section 40. Moreover, a space 78 is formed in the inner side frame 30. A pump 80 is provided inside the space 78. As illustrated in FIG. 4, the pump 80 is connected to the outer side bladder 64 through an outer side bladder supply tube 82, and is connected to the inner side bladder 76 through an inner side bladder supply tube 84.

To explain specifically, one end of the outer side bladder supply tube (outer side bag body first connection member) 82 is connected to the pump 80, and the other end of the outer side bladder supply tube 82 is connected to the outer side bladder 64. The open/close valve 72 is provided at the outer side bladder supply tube 82 and, in an open state of the open/close valve 72, gas (air) is supplied to the outer side bladder 64 through the outer side bladder supply tube 82 by operating the pump 80.

One end of the inner side bladder supply tube (inner side bag body first connection member) 84 is connected to the pump 80, and the other end of the inner side bladder supply tube 84 is connected to the inner side bladder 76. The open/close valve 74 is provided at the inner side bladder supply tube 84, and in an open state of the open/close valve 74, gas is supplied to the inner side bladder 76 through the inner side bladder supply tube 84 by operating the pump 80.

A communicating tube (communicating connection member) 86 is connected to the outer side bladder 64 and the inner side bladder 76. One end of the communicating tube 86 is connected to the outer side bladder 64, and the other end of the communicating tube 86 is connected to the inner side bladder 76. The open/close valve 75 is provided at the communicating tube 86, and in an open state of the open/ close valve 75, the outer side bladder 64 and the inner side bladder 76 are placed in communication with each other via the communicating tube 86.

The reserve tank 66 is connected to the pump 80 through a reserve tank supply tube (reserve tank connection member) 89. One end of the reserve tank supply tube 89 is connected to the reserve tank 66, and the other end of the reserve tank supply tube 89 is connected to the pump 80. An open/close valve 91 is provided at the reserve tank supply tube 89, and in an open state of the open/close valve 91, gas is capable of being supplied from the pump 80 into the reserve tank 66 through the reserve tank supply tube 89.

Figure 7:
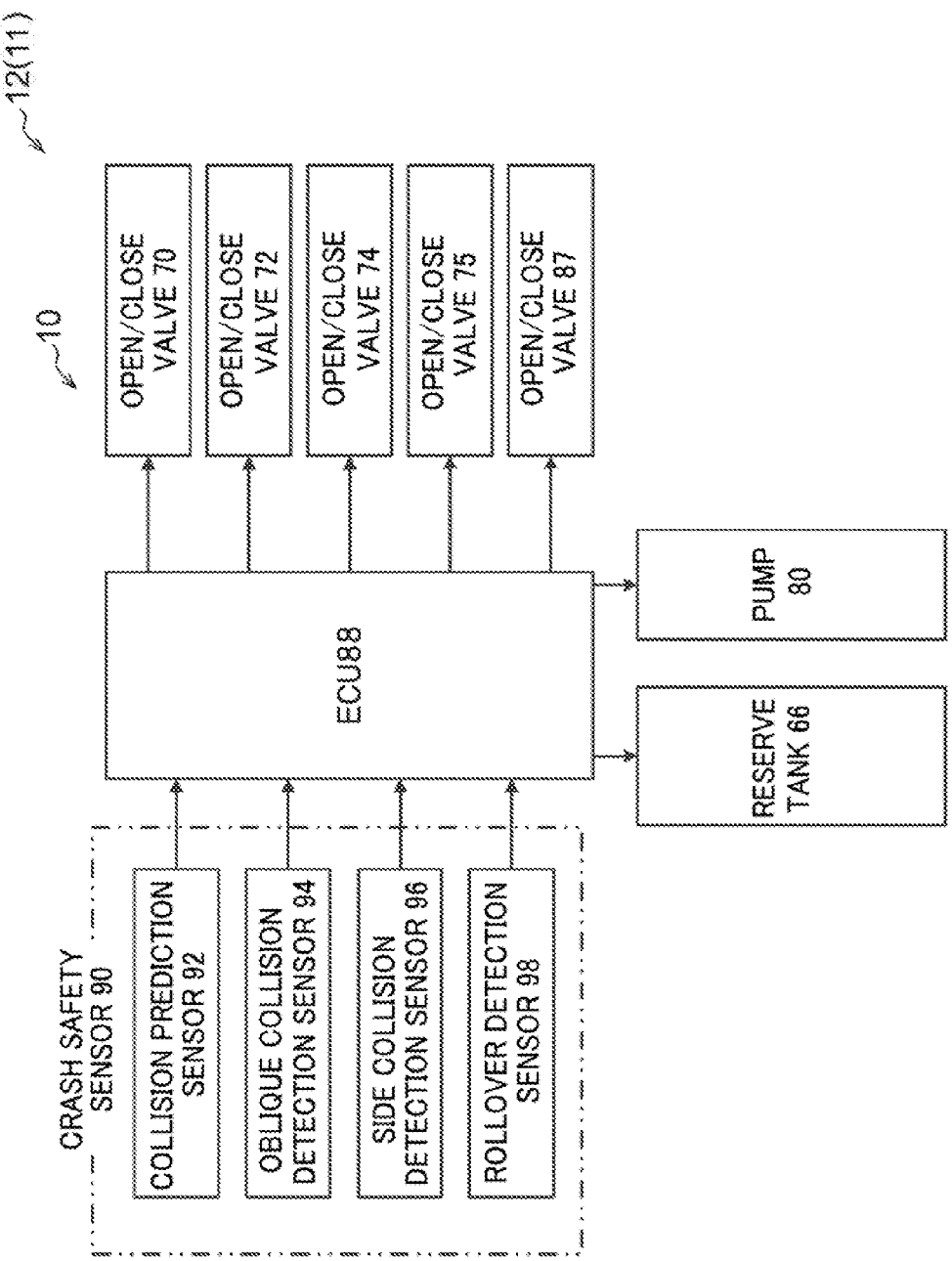
FIG. 7 is block diagram illustrating configuration of an occupant protection device according to the first exemplary embodiment.

As illustrated in FIG. 7, an ECU (controller) 88 installed to the vehicle 11 is electrically connected to the reserve tank 66 and the pump 80. A collision prediction sensor 92, an oblique collision detection sensor 94, a side collision detection sensor 96, and a rollover detection sensor 98 respectively serving as a crash safety sensor 90, are electrically connected to the ECU 88. Here, "collision" refers to head-on collisions such as what are called offset collisions and oblique collisions, side-on collisions, and rollovers.

Although not illustrated in the drawings, the collision prediction sensor 92 is configured so as to output an oblique collision prediction signal to the ECU 88 (see FIG. 7) in cases in which the possibility of an oblique head-on collision between the vehicle and another vehicle occurring has arisen. The collision prediction sensor 92 is also configured so as to output a side collision prediction signal to the ECU 88 in cases in which the possibility of a side-on collision between the vehicle and another vehicle occurring has arisen. Furthermore, the collision prediction sensor 92 is configured so as to output a rollover prediction signal to the ECU 88 in cases in which the possibility of the vehicle rolling over has arisen.

The oblique collision detection sensor 94 illustrated in FIG. 7 is configured so as to output an oblique collision detection signal to the ECU 88 in cases in which an oblique collision of the vehicle 11 has occurred, and the side collision detection sensor 96 is configured so as to output a side collision detection signal to the ECU 88 in cases in which a side collision of the vehicle 11 has occurred. Moreover, the rollover detection sensor 98 is configured so as to output a rollover detection signal to the ECU 88 in cases in which a rollover of the vehicle 11 has occurred. The open/close valves 70, 72, 74, 75, 91 are each electrically connected to, and the open/close valves 70, 72, 74, 75, 91 can be opened and closed.

Operation and Advantageous Effects of Occupant Protection Device

Next, explanation follows regarding operation and advantageous effects of the occupant protection device according to the present exemplary embodiment.

In the present exemplary embodiment, during everyday use, when a collision has not been predicted, gas (air) is supplied into the inner side bladder 76 and the outer side bladder 64 when the pump 80 is operated by a switch (not illustrated in the drawings) provided to the vehicle seat 12 illustrated in FIG. 1 and FIG. 2. The inner side bladder 76 and the outer side bladder 64 are thereby inflated when gas is supplied into the inner side bladder 76 and outer side bladder 64 by operating the pump 80.

The movable plates 62 in the inner side support section 44 and the outer side support section 40 are thereby pressed in a direction away from the respective inside walls 58 (see FIG. 6). The inner side pad 46 and the outer side pad 42 are then each displaced toward the seat width direction central side through the movable plates 62, thereby enabling adjustment of hold performance of the seated occupant in the seat width direction.

Note that discharge valves, not illustrated in the drawings, are respectively provided at the inner side bladder 76 and the outer side bladder 64, and gas in the inner side bladder 76 and the outer side bladder 64 is capable of being discharged by opening the discharge valves. This thereby enables the holding force on the seated occupant by the inner side pad 46 and the outer side pad 42 to be reduced, enabling fine adjustment of the hold performance of the seated occupant.

The reserve tank 66 is opened by the crash safety sensor 90 (see FIG. 7) when a collision has been predicted or detected. Since high pressure gas is contained within the reserve tank 66, high pressure gas is supplied into the outer side bladder 64 when the reserve tank 66 is opened.

The outer side bladder 64 is thereby capable of being made to inflate earlier. The outer side support section 40 is capable of earlier displacement toward the seat width direction central side due to inflation of the outer side bladder 64, such that relative displacement of the seated occupant toward the window 20 side is capable of being quickly suppressed. The seated occupant can thereby be protected at an early stage. In the present exemplary embodiment, relative displacement of the seated occupant along the seat width direction can thereby be effectively suppressed in a collision that has at least some acceleration component in the vehicle width direction to be imparted to the seated occupant.

Figure 8:
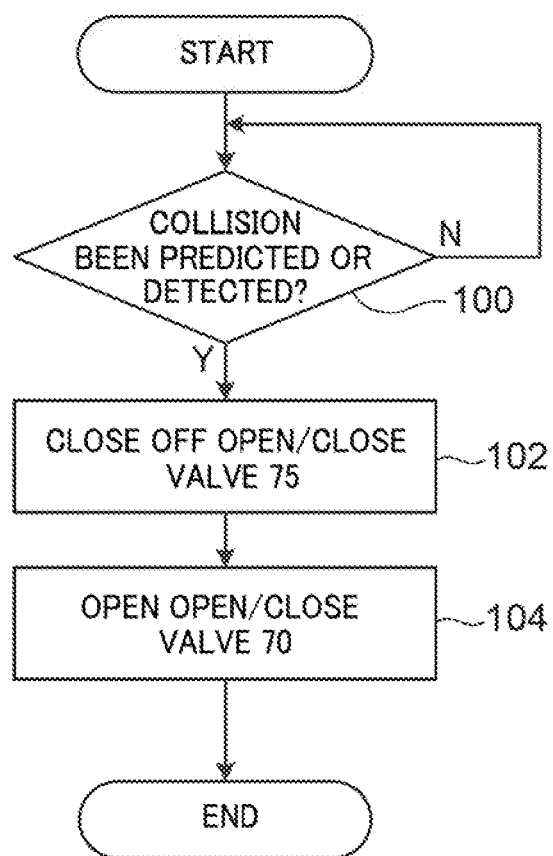
FIG. 8 is a flowchart illustrating a control method for an occupant protection device according to the first exemplary embodiment.

Explanation follows regarding an example of a control method of the present exemplary embodiment based on the flowchart illustrated in FIG. 8, with reference to FIG. 4 and FIG. 7. As illustrated in FIG. 8, at step 100, the crash safety sensor 90 determines whether or not a collision has been predicted or detected, and this determination is repeatedly executed until a collision has been predicted or detected. Processing transitions to step 102 when determination is made at step 100 that a collision has been predicted or detected.

At step 102, the open/close valve 75 is closed off. The outer side bladder 64 and the inner side bladder 76 are thereby placed in a state of non-communication. Next, processing transitions to step 104, and the open/close valve 70 is opened. High pressure gas within the reserve tank 66 is thereby supplied to the outer side bladder 64, inflating the outer side bladder 64. The outer side pad 42 is thereby displaced toward the seat width direction central side so as to suppress relative displacement of the seated occupant toward the window 20 (see FIG. 1) side, thereby protecting the seated occupant at an early stage.

Note that in the present exemplary embodiment, the crash safety sensor 90 determines whether or not a collision has been predicted or detected; however, when explaining chronologically, the signal of collision prediction is transmitted to the ECU 88 at an earlier timing than the signal of collision detection. However, this time difference is small, and it is sufficient that relative displacement of the seated occupant toward the window 20 (see FIG. 1) can be suppressed at an early stage, protecting the seated occupant, by the time that the processing executed by the ECU 88 is completed.

Note that in the present exemplary embodiment, the reserve tank 66 is disposed inside the outer side support section 40. The reserve tank 66 is accordingly disposed near the outer side bladder 64.

A length of the outer side bladder supply tube 68 that joins the reserve tank 66 to the outer side bladder 64 can thereby be shortened. Accordingly, pressure loss of the high pressure gas flowing in the outer side bladder supply tube 68 can be reduced, thereby enabling the outer side bladder 64 to be inflated at an early stage such that the outer side support section 40 is displaced toward the seat width direction central side earlier.

In the present exemplary embodiment, the pump 80 is provided inside the inner side support section 44. Although not illustrated in the drawings, sometimes a side airbag is provided at the window 20 side of the vehicle seat 12 illustrated in FIG. 1 and FIG. 2, namely, inside the outer side support section 40. Accordingly, in the present exemplary embodiment, a space for the pump 80 is secured by providing the pump 80 inside the inner side support section 44 positioned on the opposite side of the vehicle seat 12 to the window 20.

Furthermore, as illustrated in FIG. 4, the present exemplary embodiment is provided with the communicating tube 86 that places the outer side bladder 64 and the inner side bladder 76 in communication with each other. During everyday use, when a collision has not been predicted or detected, when gas is supplied to the outer side bladder 64 or the inner side bladder 76 by operating the pump 80, the pressure in the outer side bladder 64 and the pressure in the inner side bladder 76 can be substantially equalized through the communicating tube 86. The seated occupant who is relatively displaced with respect to the vehicle seat 12 in the seat width direction can thereby be held with substantially the same pressure by the outer side pad 42 and the inner side pad 46.

In the present exemplary embodiment, the reserve tank supply tube 89 is connected to the reserve tank 66, such that gas from the pump 80 may be supplied to the reserve tank 66. High pressure gas is contained within the reserve tank 66; however, there is difficulty in continuously retaining the pressure of the high pressure gas within the reserve tank 66, since the pressure gradually lowers with the passing of time.

Thus, when the pressure of the high pressure gas within the reserve tank 66 becomes lower than a preset pressure, the open/close valve 91 opens, and gas from the pump 80 is supplied into the reserve tank 66 through the reserve tank supply tube 89. The pressure of the gas that has become a lower pressure than the preset pressure within the reserve tank 66 can thereby be raised. The pressure of the high pressure gas within the reserve tank 66 can thereby be retained at a substantially constant pressure.

When comparing the outer side bladder 64 with the inner side bladder 76, the outer side bladder 64 is disposed at the window 20 (see FIG. 1) side. In consideration of preventing ejection of the seated occupant out of the vehicle in a collision, the reserve tank 66 is connected to the outer side bladder 64 alone in the present exemplary embodiment; however, the present disclosure is not limited to the present exemplary embodiment.

Second Exemplary Embodiment

In the first exemplary embodiment, as illustrated in FIG. 4, the reserve tank 66 is connected to the pump 80 and to the outer side bladder 64, but is not connected to the inner side bladder 76. However, in a second exemplary embodiment as illustrated in FIG. 9, the reserve tank 66 is connected to the inner side bladder 76 as well as to the pump 80 and to the outer side bladder 64.

In the present exemplary embodiment, one end of an inner side bladder supply tube (inner side bag body second connection member) 85 is connected to the reserve tank 66, and the other end of the inner side bladder supply tube 85 is connected to the inner side bladder 76. Moreover, an open/close valve (bag body open/close valve) 87 is provided at the inner side bladder supply tube 85 such that, in an open state of the open/close valve 87, high pressure gas within the reserve tank 66 can be supplied to the inner side bladder 76 through the inner side bladder supply tube 85.

In the present exemplary embodiment, using the ECU 88 illustrated in FIG. 7, opening and closing of the open/close valves 70, 75, 87 is controlled by the ECU 88 according to the collision mode of the vehicle 11 detected by the crash safety sensor 90. Note that "collision modes" here encompass cases in which a collision with a colliding body has been predicted or detected on the side nearest the seated occupant in question (near-side collision), cases in which a collision with a colliding body has been predicted or detected on the side farther away from the seated occupant (far-side collision), vehicle rollovers, and the like. For example, in the present exemplary embodiment, the vehicle seat 12 disposed on the vehicle left side is taken as a reference. Thus, cases in which the colliding body collides at the left side of the vehicle 11 are near-side collisions, and cases in which the colliding body collides at the right side of the vehicle 11 are far-side collisions.

Figure 9:
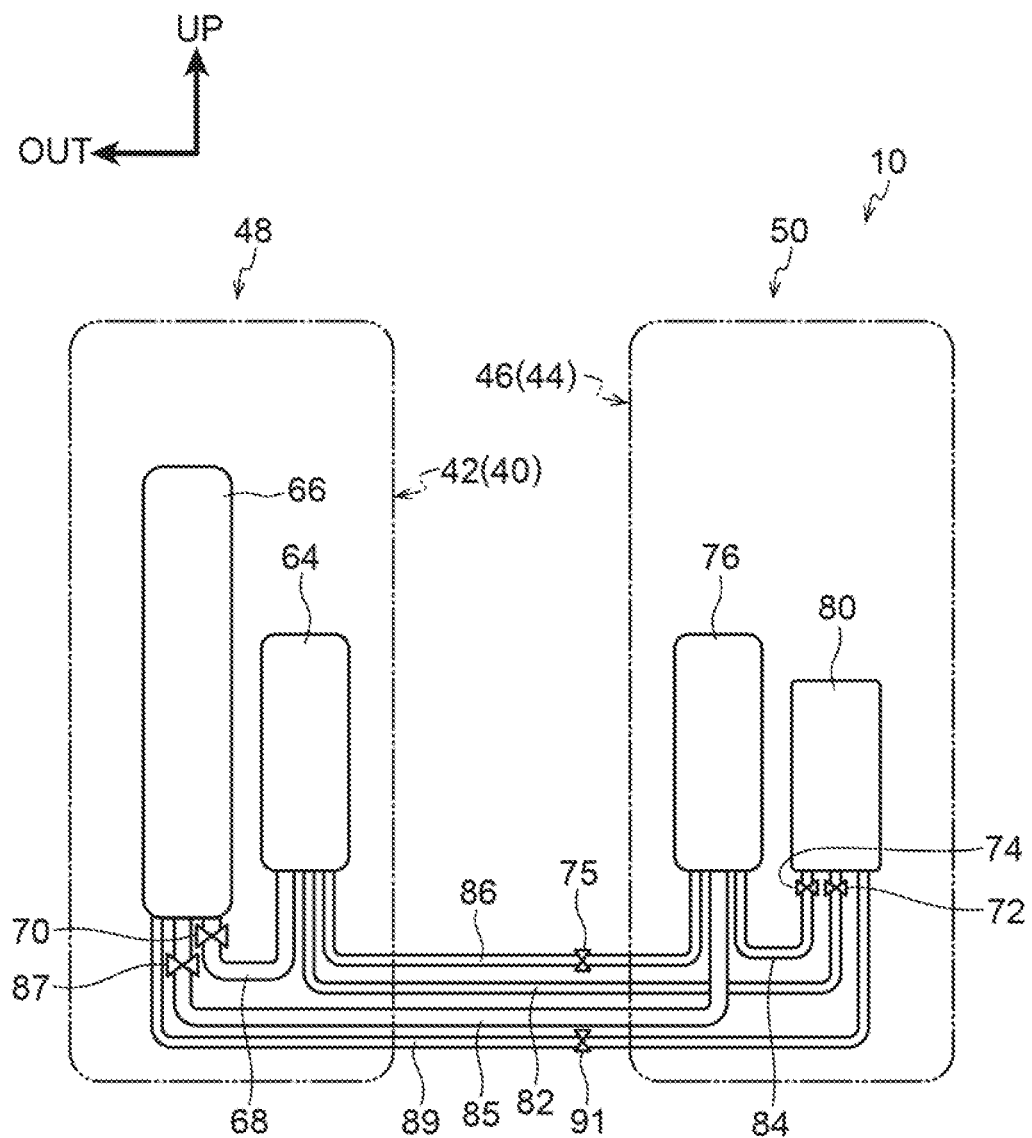
FIG. 9 is schematic configuration diagram illustrating a modified example of configuration of an occupant protection device according to a second exemplary embodiment.
Figure 10:
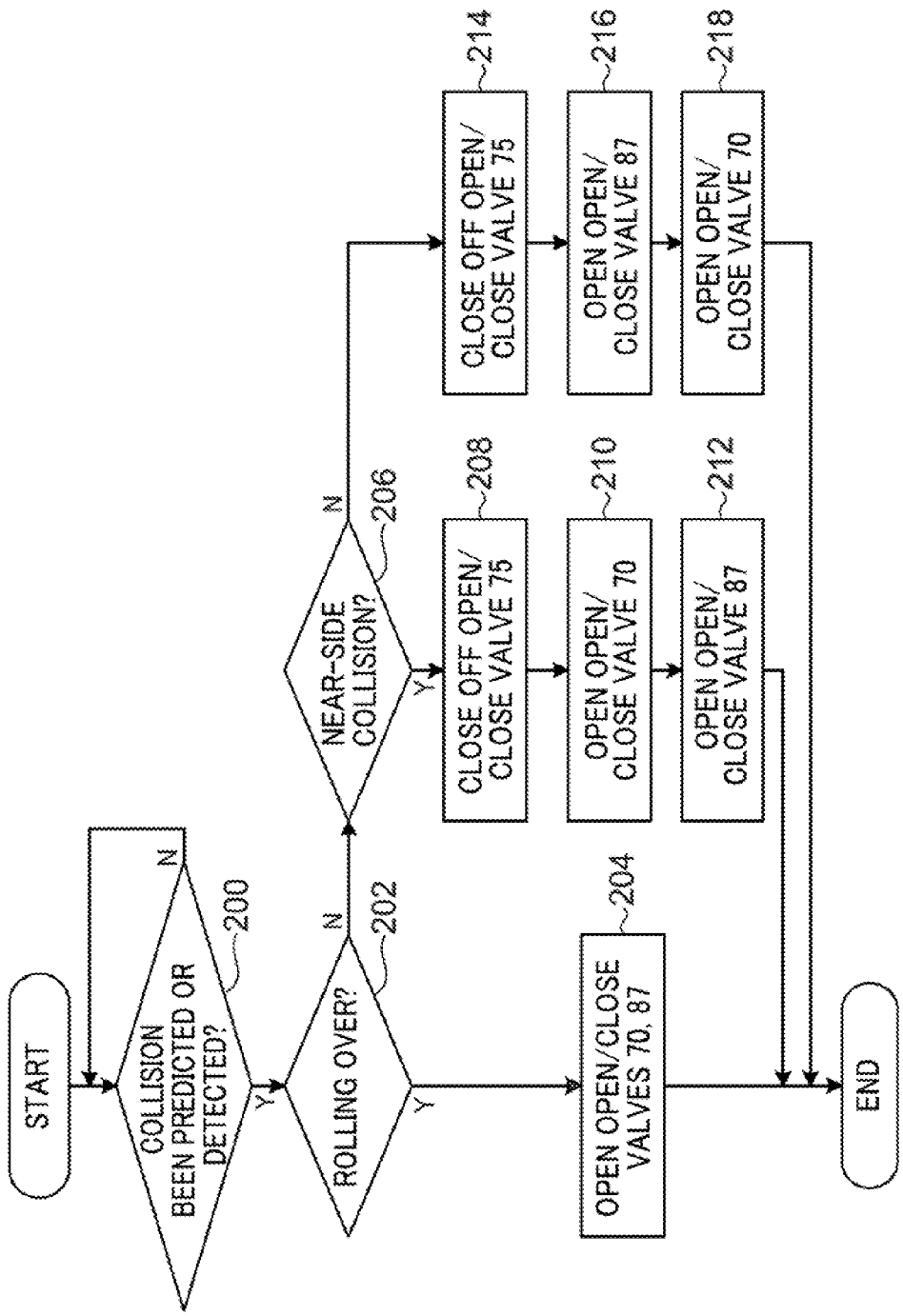
FIG. 10 is a flowchart illustrating a control method for an occupant protection device according to the second exemplary embodiment.

Specific explanation follows regarding an example of a control method of the present exemplary embodiment based on the flowchart illustrated in FIG. 10, with reference to FIG. 7 and FIG. 9. As illustrated in FIG. 10, at step 200, the crash safety sensor 90 determines whether or not a collision has been predicted or detected, and this determination is repeatedly executed until a collision has been predicted or detected. Processing transitions to step 202 when determination is made at step 200 that a collision has been predicted or detected.

At step 202, the rollover detection sensor 98 determines whether or not the vehicle 11 is rolling over. Processing transitions to step 204 when determination is made at step 202 that the vehicle 11 is rolling over. At step 204, the open/close valves 70, 87 are opened. High pressure gas within the reserve tank 66 is thereby supplied to the outer side bladder 64 and to the inner side bladder 76 such that the outer side bladder 64 and the inner side bladder 76 inflate. As a result, the outer side pad 42 and the inner side pad 46 are each displaced toward the seat width direction central side, and relative displacement of the seated occupant along the seat width direction can be suppressed at an early stage, thereby protecting the occupant.

Processing transitions to step 206 when determination is made at step 202 that the vehicle 11 is not rolling over. At step 206, the oblique collision detection sensor 94 and the side collision detection sensor 96 determine whether or not the collision is a near-side collision. Note that here, the vehicle seat 12 disposed on the vehicle left side is taken as a reference. Thus, near-side collisions are cases in which the colliding body collides to the left side of the vehicle 11 and far-side collisions are cases in which the colliding body collides to the right side of the vehicle 11. Processing transitions to step 208 when determination is made at step 206 that the collision is a near-side collision. At step 208, the open/close valve 75 is closed off. The outer side bladder 64 and the inner side bladder 76 are thereby in a state of non-communication with each other.

Next, processing transitions to step 210, and the open/close valve 70 is opened. High pressure gas within the reserve tank 66 is thereby supplied to the outer side bladder 64 such that the outer side bladder 64 inflates. The outer side pad 42 thereby displaces toward the seat width direction central side, and relative displacement of the seated occupant toward the window 20 (see FIG. 1) is suppressed, protecting the seated occupant at an early stage. Next, processing transitions to step 212, and the open/close valve 87 is opened, such that high pressure gas within the reserve tank 66 is then supplied to the inner side bladder 76. The inner side bladder 76 thereby inflates, displacing the inner side pad 46 toward the seat width direction central side. Relative displacement of the seated occupant due to the movement of the seated occupant swinging back toward the collision-opposite side is accordingly suppressed, protecting the seated occupant.

When determination is made at step 206 that the collision is not a near-side collision, determination is made that the collision is a far-side collision, and processing transitions to step 214. At step 214, the open/close valve 75 is closed off. Accordingly, the outer side bladder 64 and the inner side bladder 76 are in a state of non-communication. Next, processing transitions to step 216, and the open/close valve 87 is opened. High pressure gas within the reserve tank 66 is thereby supplied to the inner side bladder 76, inflating the inner side bladder 76, such that the inner side pad 46 displaces toward the seat width direction central side. Next, processing transitions to step 218, and the open/close valve 70 is opened. High pressure gas within the reserve tank 66 is then supplied to the outer side bladder 64, inflating the outer side bladder 64, thereby displacing the outer side pad 42 toward the seat width direction central side.

Note that, although not particularly discussed in the present exemplary embodiment, a side airbag device (not illustrated in the drawings) may obviously be disposed inside the outer side support section 40. As explained above, in the present exemplary embodiment, the outer side bladder 64 is made to inflate after the inner side bladder 76 has been inflated in a far-side collision. However, in cases in which a side airbag device is disposed at the vehicle seat 12, the side airbag inflates toward the front side when a collision has been predicted or detected. The outer side bladder 64 is therefore not necessarily required to inflate after the inner side bladder 76 has been inflated in a far-side collision.

As described above, in the present exemplary embodiment, in cases in which a collision has been predicted or detected, the bladder positioned on the collision side, from out of the outer side bladder 64 or the inner side bladder 76, can be made to inflate earlier. Namely, relative displacement of the seated occupant along the seat width direction can be suppressed at an early stage, protecting the seated occupant according to the collision mode of the vehicle 11.

In the present exemplary embodiment, the timings of the opening of the open/close valves 70, 87 to inflate the outer side bladder 64 and the inner side bladder 76 vary according to the collision mode of the vehicle 11 (near-side collision, far-side collision, or rollover); however, the timings are not necessarily required to vary. Namely, when a collision has been predicted or detected, the open/close valves 70, 87 may be opened at the same time as each other. Compared to the former case, this enables simplification of control and cost reduction.

In the present exemplary embodiment, a cross-sectional area of the flow path (A1) of the outer side bladder supply tube 68 is set larger than a cross-sectional area of the flow path (A2) of the outer side bladder supply tube 82 (A1>A2). At the same speed of flow, the quantity of flow per unit time (flow rate) of high pressure gas flowing in the outer side bladder supply tube 68 is thereby higher than the flow rate of gas flowing in the outer side bladder supply tube 82. By making the cross-sectional area of the flow path of the outer side bladder supply tube 68 larger in this manner, the flow rate of high pressure gas flowing in the outer side bladder supply tube 68 is higher, and the outer side bladder 64 is thereby capable of inflating at an earlier stage in a collision.

In the present exemplary embodiment, the cross-sectional area of the flow path A1 of the outer side bladder supply tube 68 is set larger than the cross-sectional area of the flow path A2 of the outer side bladder supply tube 82 (A1>A2). However, is it sufficient that the flow rate of the gas flowing in the outer side bladder supply tube 68 connected to the reserve tank 66 is higher than the flow rate of gas flowing in the outer side bladder supply tube 82 connected to the pump 80, and so configuration of the outer side bladder supply tube 68 and of the outer side bladder supply tube 82 is not limited thereto.

For example, the cross-sectional area of the flow path A1 of the outer side bladder supply tube 68 and the cross-sectional area of the flow path A2 of the outer side bladder supply tube 82 may be configured to be substantially the same, and the length of the outer side bladder supply tube 68 may be set shorter than that of the outer side bladder supply tube 82. Pressure loss of gas flowing in the outer side bladder supply tube 68 can thereby be reduced, and as a result, the flow rate of the gas can be increased. Namely, the lengths of the outer side bladder supply tube 68 and the outer side bladder supply tube 82 may be varied to adjust the flow rate of the gas.

Moreover, the flow path of the outer side bladder supply tube 68 may also be set with a larger cross-sectional area than that of connection members other than the outer side bladder supply tube 68, in addition to the outer side bladder supply tube 82. Compared to other connection members, the flow rate of gas flowing in the outer side bladder supply tube 68 would then be higher8.

Supplementary Explanation of Exemplary Embodiments

In the exemplary embodiments described above, explanation has been given in which air is used as an example of the gas supplied to the outer side bladder 64 and to the inner side bladder 76; however, there is no limitation to air.

As illustrated in FIG. 2, the reserve tank 66 is set inside the outer side support section 40; however, there is no limit thereto. For example, although not illustrated in the drawings, the reserve tank 66 may be provided inside the inner side support section 44, or may be disposed in the lower frame 24 (see FIG. 1).

In the present exemplary embodiments, as illustrated in FIG. 4, the outer side bladder 64 and the inner side bladder 76 are in communication with each other; however, the outer side bladder 64 and the inner side bladder 76 are not necessarily required to be in communication with each other. This is because the outer side bladder 64 and the inner side bladder 76 are capable of displacing the respective outer side pad 42 and the inner side pad 46 to the seat width direction central side by operation of the pump 80.

Furthermore, in the present exemplary embodiments, as illustrated in FIG. 2, the outer side bladder 64 is provided at the support wall 58C of the outer side frame 28 disposed on the seat width direction outer side of the vehicle seat 12, and the inner side bladder 76 is provided at the support wall 58C of the inner side frame 30 disposed on the seat width direction inner side of the vehicle seat 12, respectively. The outer side pad 42 and the inner side pad 46 are thereby each capable of displacing toward the seat width direction central side. However, the placement locations of the outer side bladder 64 and the inner side bladder 76 are not limited thereto. For example, the outer side bladder 64 and the inner side bladder 76 may be provided at lateral wall portions 58A of the respective outer side frame 28 and the inner side frame 30. In such cases, the outer side pad 42 and the inner side pad 46 are each capable of displacing (extending out) toward the front side of the vehicle seat 12. Here, relative displacement of the seated occupant along the seat width direction is suppressed due to the displacement of the outer side pad 42 and inner side pad 46 toward the front side of the vehicle seat 12. Furthermore, the outer side bladder 64 and the inner side bladder 76 may be provided at both the support wall 58C and the lateral wall portion 58A of the respective outside frame 28 and the inside frame 30. In such cases, the outer side pad 42 and the inner side pad 46 are each capable of displacing toward the seat width direction central side and the front side of the vehicle seat 12.

Explanation has been given regarding several exemplary embodiments of the present disclosure; however, various modifications may be implemented within a range of the present disclosure. Moreover, obviously, the scope of rights of the present disclosure is not limited to the above exemplary embodiments.

What is claimed is:

1. An occupant protection device comprising:
a pair of bag bodies, that are provided in left and right side support sections in a seat width direction of a seatback of a vehicle, and that displace the side support sections by inflating when supplied with gas, the pair of bag bodies including:
an outer side bag body provided in an outer side support section that is disposed on a window side of a vehicle; and
an inner side bag body provided in an inner side support section that is disposed on an opposite side to the outer side support section;
a first gas supply mechanism that supplies gas to the pair of bag bodies during everyday use, the first gas supply mechanism including:
a pump provided in the inner side support section;
an outer side bag body first connection member that is connected to the pump and the outer side bag body, and that supplies gas from the pump to the outer side bag body; and
an inner side bag body first connection member that is connected to the pump and the inner side bag body, and that supplies gas from the pump to the inner side bag body; and
a second gas supply mechanism that supplies gas to at least the outer side bag body and that inflates at least one of the bag bodies more quickly than in cases in which the pair of bag bodies are inflated by gas supplied by the first gas supply mechanism, in the event that a collision has been predicted or detected, the second gas supply mechanism including a reserve tank that:
is connected to the outer side bag body;
contains high pressure gas at a higher pressure than a pressure in the at least one bag body; and
is capable of supplying the high pressure gas to the at least one bag body.

2. The occupant protection device of claim 1, wherein the reserve tank is disposed in the outer side support section.

3. The occupant protection device of claim 1, further comprising a communicating connection member that places the outer side bag body and the inner side bag body in communication with each other.

4. The occupant protection device of claim 1, wherein the second gas supply mechanism further includes a reserve tank connection member that is connected to the pump and the reserve tank, and that supplies gas from the pump to the reserve tank.

5. The occupant protection device of claim 1, wherein the second gas supply mechanism further includes:
- an outer side bag body second connection member that is connected to the reserve tank and the outer side bag body, and that supplies the high pressure gas within the reserve tank to the outer side bag body; and
- an inner side bag body second connection member that is connected to the reserve tank and the inner side bag body, and that supplies the high pressure gas within the reserve tank to the inner side bag body.

6. The occupant protection device of claim 5, wherein:
- a cross-sectional area of a flow path of the outer side bag body second connection member is larger than a cross-sectional area of a flow path of the outer side bag body first connection member.

7. The occupant protection device of claim 5, further comprising:
- a bag body open/close valve that is respectively provided at both of the pair of bag bodies so as to be capable of opening and closing between the both of the pair of bag bodies and the reserve tank, and that supply the high pressure gas within the reserve tank to the respective bag body by opening; and
- a controller that opens the bag body open/close valve at the bag body disposed on a side nearest to a position of a collision predicted or detected by a crash safety sensor.

8. The occupant protection device of claim 5, further comprising:
- a bag body open/close valve that is respectively provided at both of the pair of bag bodies so as to be capable of opening and closing between the both of the pair of bag bodies and the reserve tank, and that supply the high pressure gas within the reserve tank to the respective bag body by opening; and
- a controller that opens the both of the bag body open/close valves of the pair of bag bodies in the event that a vehicle rollover has been predicted or detected by a crash safety sensor.

* * * * *